L. COATSWORTH.
FILM GATE FOR MOTION PICTURE MACHINES.
APPLICATION FILED MAR. 31, 1917. RENEWED MAR. 27, 1919.

1,348,626.

Patented Aug. 3, 1920.
2 SHEETS—SHEET 1.

Witness:
Leo J. Dumais.

Inventor:
Louis Coatsworth,
By Robert Burns,
Atty.

L. COATSWORTH.
FILM GATE FOR MOTION PICTURE MACHINES.
APPLICATION FILED MAR. 31, 1917. RENEWED MAR. 27, 1919.
1,348,626.
Patented Aug. 3, 1920.
2 SHEETS—SHEET 2.
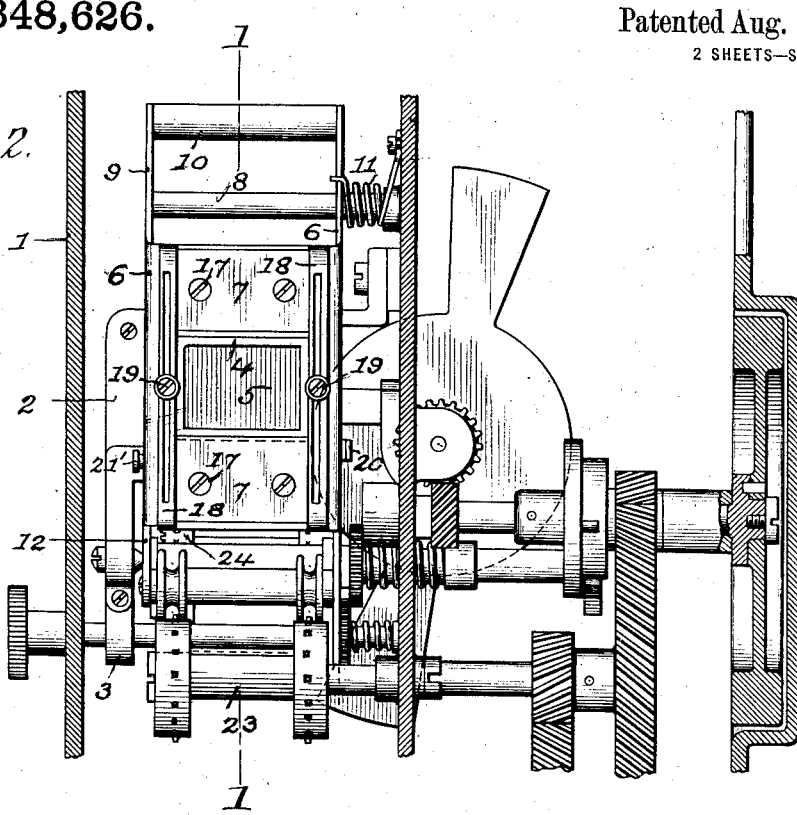
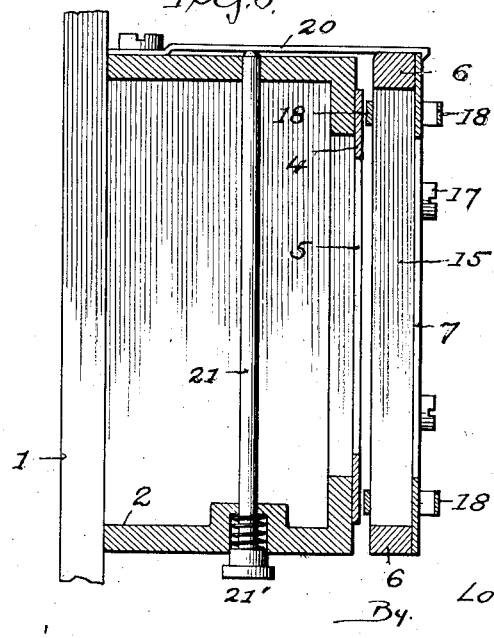
Witness:
Leo F. Dumais.
Inventor:
Louis Coatsworth,
By Robert Burns,
Atty.

UNITED STATES PATENT OFFICE.

LOUIS COATSWORTH, OF CHICAGO, ILLINOIS, ASSIGNOR TO SAFETY PROJECTOR & FILM CO., OF PORTLAND, MAINE, A CORPORATION OF MAINE.

FILM-GATE FOR MOTION-PICTURE MACHINES.

1,348,626.  Specification of Letters Patent.  Patented Aug. 3, 1920.

Original application filed November 7, 1916, Serial No. 129,977. Divided and this application filed March 31, 1917, Serial No. 159,010. Renewed March 27, 1919. Serial No. 285,647.

*To all whom it may concern:*

Be it known that I, LOUIS COATSWORTH, a citizen of the United States of America, and a resident of Chicago, in the county of Cook, State of Illinois, have invented certain new and useful Improvements in Film-Gates for Motion-Picture Machines, of which the following is a specification.

This invention is a division of the subject matter of an original application for Letters Patent, Serial No. 129,977, filed by me in the United States Patent Office on the 7th day of November, 1916, and relates to that class of motion picture machines in which the picture film has intermittent travel past the light aperture of the machine. And the present improvement has for its objects:—

To provide in connection with the light aperture plate and the intermittent film feeding mechanism of the machine, a film confining structure or gate adapted to guide and maintain the picture film against said aperture plate in a steady manner, without undue frictional resistance to the movement of the film, such gate structure carrying the different idler drums by which the film is maintained in driving engagement with the sprocket drums of the mechanism, and so that in an opening of the film gate to effect a film threading operation, the said idler drums will move away from their sprocket drums, to permit a ready lateral threading of the film, or the like unthreading of the film.

To provide in connection with the film confining gate, means for holding the film in proper position and at the same time prevent the extension of the flame, in case of an accidental firing of the film at the light aperture or optical axis of the machine.

To provide a simple and convenient latching means for securing the film confining gate in position. All as will hereinafter more fully appear.

In the accompanying drawings:—

Fig. 2, is a detail rear elevation of the same.

Fig. 3, is a detail horizontal section on line 3—3, Fig. 1.

Similar reference numerals indicate like parts in the several views.

Figure 1:
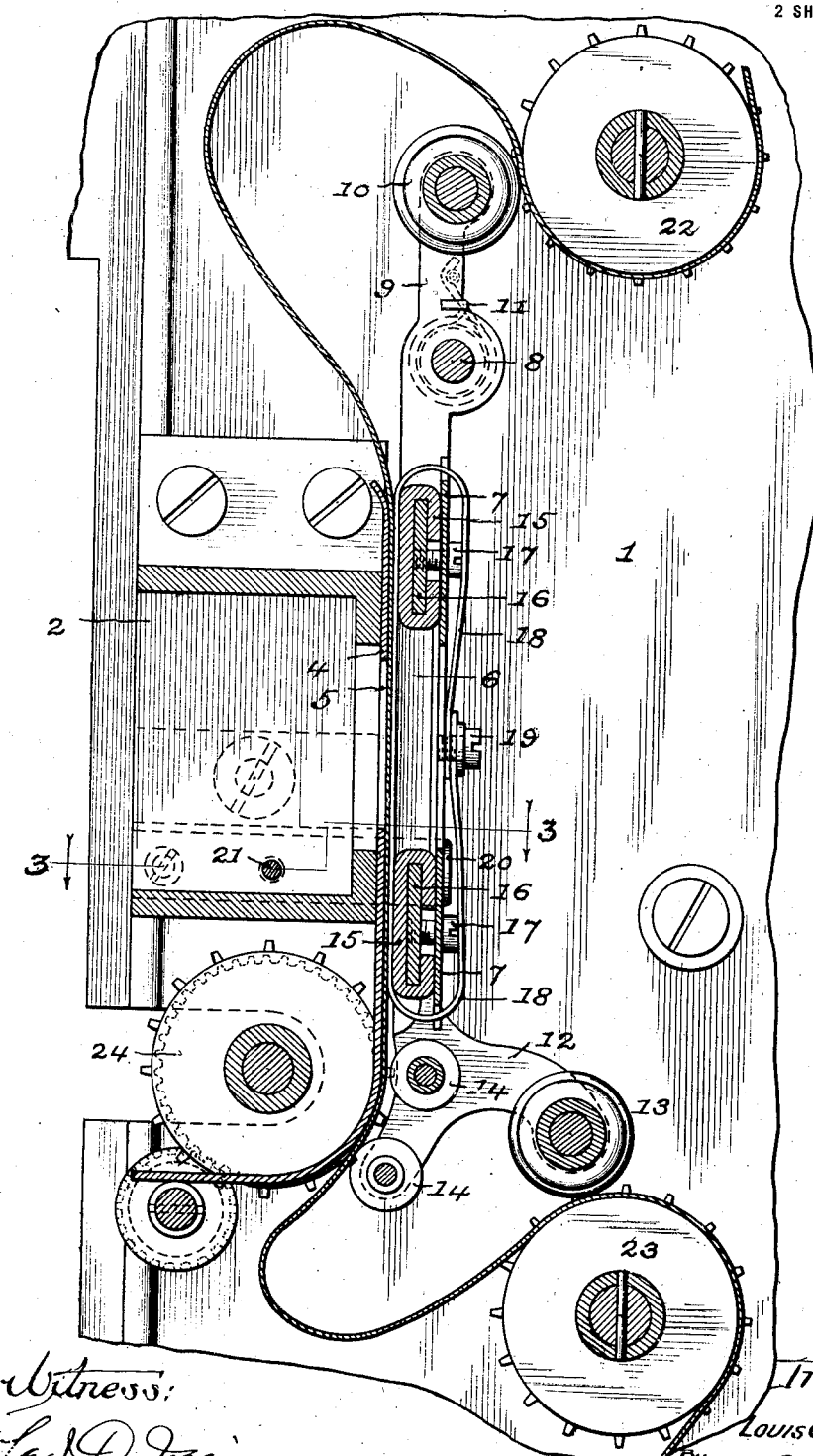
- Figure 1 is a detail longitudinal section on line 1—1, Fig. 2 of the present film feeding and guiding mechanism.

Referring to the drawings, 1 designates a portion of the inclosing box or housing of a motion picture apparatus, preferably formed with a plurality of vertical walls which provide journal bearings for the different shafts of the operating mechanism, as usual in the present class of motion picture machines.

2 designates a supporting frame secured to and extending transversely from an intermediate wall of the housing 1, aforesaid, and formed with the usual light aperture or passage, and with a depending leg 3 for the support of one end of the carrying shaft of the intermittent film feeding sprocket drum, and accessories hereinafter described.

4 designates the usual film guiding plate secured to the frame 2 aforesaid, and formed with the framing or light aperture 5 of the machine. And as usual in the present class of machines, the passing picture film will have sliding contact with the adjacent face of the plate 4 and be maintained in such contact and against any vibratory movement by a confining gate associated with said guide plate 4.

The film confining gate above referred to, has a swinging movement in a vertical plane to and from the guide plate 4 aforesaid, and in the present improvement will comprise a structural formation and association of parts, as follows:—

6 designates a pair of vertical side rails disposed in spaced relation to each other at opposite sides of the light aperture 5 aforesaid, and connected together by upper and lower transverse webs or plates 7, which in turn are in spaced relation with the separating space greater than the height of the light aperture 5 aforesaid.

8 designates a transverse shaft passing through bearing hubs near the upper ends of the side rails 6 to form a pivotal support for said rails and other gate elements connected to said rails.

9 designate vertical extensions at the upper ends of the side rails 6, and having bearing hubs for the journal shaft of an idler or bearing roller 10, by which the picture film is held in operative engagement with the loop forming sprocket drum hereinafter described.

11 designates a spring tending to move the gate structure away from its operative relation to the film guiding plate 4 aforesaid, 12 designate forked extensions at the lower end of the side rails 6 aforesaid, with the ends of the forked members formed with bearing hubs for the journal shafts of idler or bearing rollers 13, 14, by which the picture film is held in operative engagement with the intermittent film feeding sprocket drum, and with the take up sprocket drum, hereinafter described.

15 designate bearing pads of felt or like yielding material carried by transverse webs or rails 16, and each pad comprising a strip of said material folded around a rail 16 and confined in place on a transverse web or plate 7 by a clamping screw 17 passing through said plate 7 and screwing into a rail 16, as shown more particularly in Fig. 1. The bearing pads 15 in conjunction with the film guiding plate 4 aforesaid, are adapted to provide narrow transverse throats for the passage of the picture film, and are intended to prevent the transmission of flame from a burning portion of the picture film at one side of the pad to a portion of the film at the other side of said pad.

18 designate resilient bearing rails or runners carried by the gate structure above described, and located at the respective sides of the light aperture 5 aforesaid, and at the ends of the pads 15. Said rails are adapted to have resilient bearing upon the marginal portions of the film to hold the same in contact with the film guiding plate 4 aforesaid, and each of said bearing rails is preferably formed of a strip of resilient material bent into the form of a flat loop, the ends of which are secured, at the mid-height of a bearing rail to the rear of the gate structure by an attaching screw 19, as shown.

20 designates a spring catch adapted to engage an edge of the gate structure above described, and hold the same in proper operative relation to the film guiding plate 4 aforesaid.

21 designates an operating bolt sliding transversely in the supporting frame 2 aforesaid, and provided at one end with an operating button 21', while its other end is in operative engagement with the spring catch 20, and adapted to force the same from its holding engagement with the gate structure when it is desired to open the same for the replacement of films and like operations.

22 and 23 designate upper and lower sprocket drums, the carrying shafts of which are journaled in intermediate vertical walls of the inclosing housing 1, and receive constant rotation from the driving mechanism of the machine, as usual in the present class of motion picture machines.

The upper sprocket drum 22 aforesaid is intended in the normal operation of the mechanism, to draw the film from an upper film reel and supply said film in the form of a loose loop to the film guiding means heretofore described, and through which the film is drawn past the light aperture 5 by the intermittently operating sprocket drum 70 hereinafter described.

The lower sprocket drum 23 aforesaid, is intended in the above mentioned normal operation of the mechanism, to take up the picture film as it passes from the intermittent film feeding sprocket drum above referred to, and feed said film in a constant manner to a receiving reel.

24 designates the intermittent film feeding sprocket drum above referred to, the carrying shaft of which is journaled in the lower portion of the supporting frame 2, as shown. The rear portion of the periphery of the drum 24, is in a plane with the film guiding plate 4 aforesaid, and the rear and lower part of said periphery has associated relation with the forwardly curved lower end of the said film guiding plate, as shown in Fig. 1.

Having thus fully described my said invention, what I claim as new and desire to secure by Letters Patent, is:—

1. In a motion picture machine, a main frame, a fixed apertured guide plate for a picture film, a film feeding sprocket drum associated with the lower end of said guide plate, an upper film supply sprocket drum and a lower film take-up sprocket drum associated with the respective upper and lower ends of said guide plate and located to the rear of the film feeding sprocket drum, and a film confining gate pivoted to the main frame near the upper end of the guide plate and having pivotal movement in a vertical plane, said gate having an extension above its pivot point carrying a bearing roller adapted to bear against a forward side of the film supply sprocket drum and a forked extension at its lower end, with the forks of said extension carrying bearing rollers adapted to bear against an upper side of the film take-up sprocket drum and a rear side of the film feeding sprocket drum respectively, substantially as set forth.

2. In a motion picture machine, the combination of a main frame, a stationary apertured guide plate for the film, means for feeding said film past the light aperture, a film confining gate associated with said guide plate and having a fixed transverse web, and a bearing pad formed of a strip of yielding material folded around a transverse rail and detachably secured to the gate by a screw passing through the transverse web aforesaid and screwing into the transverse rail between the respective ends of the pad strip aforesaid, substantially as set forth.

3. In a motion picture machine, the combination of a main frame, a stationary apertured guide plate for the film, means for feeding said film past the light aperture, a film confining gate associated with said guide plate and comprising end rails and a transverse connecting plate having upper and lower transverse webs, and upper and lower bearing pads formed of strips of yielding material folded around transverse rails, each pad being secured in place by a screw passing through a transverse web aforesaid and screwing into a transverse rail between the ends of the pad strip aforesaid, substantially as set forth.

Signed at Chicago, Illinois, this 22nd day of March, 1917.

LOUIS COATSWORTH.